United States Patent
Shige et al.

(10) Patent No.: US 7,905,157 B2
(45) Date of Patent: Mar. 15, 2011

(54) BALL SCREW UNIT

(75) Inventors: Yoshifumi Shige, Kashiba (JP); Yasushi Kadota, Nara (JP); Satoshi Kondo, Okazaki (JP); Atsushi Sakuta, Kani (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 250 days.

(21) Appl. No.: 12/320,014

(22) Filed: Jan. 14, 2009

(65) Prior Publication Data

US 2009/0193920 A1 Aug. 6, 2009

(30) Foreign Application Priority Data

Jan. 15, 2008 (JP) .................................. 2008-005501

(51) Int. Cl.
F16H 3/06 (2006.01)
F16H 1/20 (2006.01)
F16H 27/02 (2006.01)
F16H 29/02 (2006.01)
F16H 29/20 (2006.01)
F16H 1/24 (2006.01)
F16H 55/02 (2006.01)

(52) U.S. Cl. ...................... 74/424.82; 74/89.37; 74/89.3

(58) Field of Classification Search ........... 74/89, 89.23, 74/89.32, 89.33, 89.37, 89.3, 424.81, 424.82, 74/424.83; 384/54

See application file for complete search history.

(56) References Cited

U.S. PATENT DOCUMENTS

| 2,401,757 | A | * | 6/1946 | Hardsocg | ..................... | 74/89.23 |
| 5,121,647 | A | * | 6/1992 | Teramachi | ..................... | 74/89.3 |
| 5,649,451 | A | * | 7/1997 | Ruland | ......................... | 74/89.3 |
| 6,202,803 | B1 | | 3/2001 | Lang | | |
| 6,761,080 | B2 | * | 7/2004 | Lange et al. | ................. | 74/89.37 |

FOREIGN PATENT DOCUMENTS

| JP | 7-237172 | 9/1995 |
| JP | 9-177925 | 7/1997 |
| JP | 2005-264992 | 9/2005 |

OTHER PUBLICATIONS

Extended European Search Report dated Dec. 17, 2009.

* cited by examiner

*Primary Examiner* — Thomas R Hannon
*Assistant Examiner* — Justin Krause
(74) *Attorney, Agent, or Firm* — McGinn IP Law Group, PLLC

(57) ABSTRACT

A housing has a screw shaft passing wall in which a through hole, through which a screw shaft passes, is formed. A spline outer cylinder is held at one end by the screw shaft passing wall, and a disc spring that biases the spline outer cylinder toward the screw shaft passing wall is arranged at the other end of the spline outer cylinder. A tapered recess is formed in one end face of the spline outer cylinder, and a tapered projection that is fitted in the tapered recess is formed in a face of the screw shaft passing wall of the housing, which faces the spline outer cylinder.

7 Claims, 2 Drawing Sheets

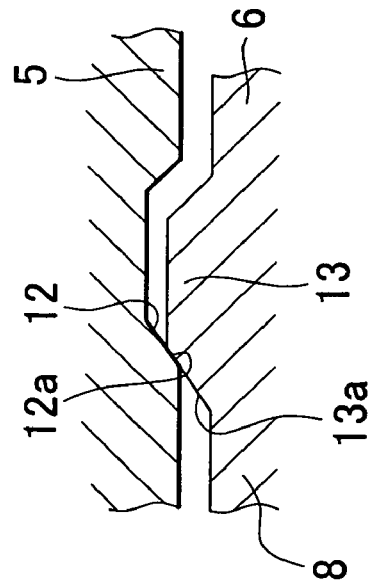
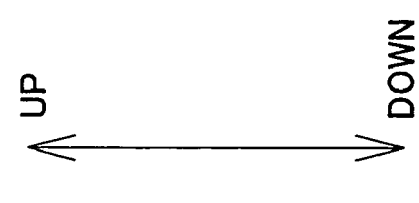
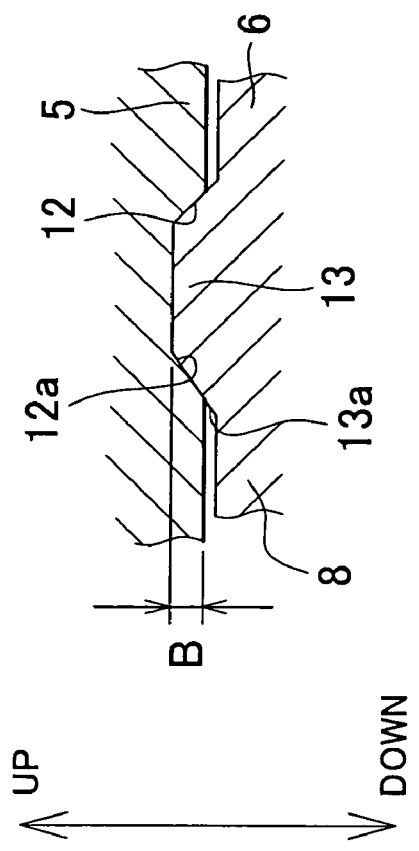

BALL SCREW UNIT

INCORPORATION BY REFERENCE

The disclosure of Japanese Patent Application No. 2008-005501 filed on Jan. 15, 2008 including the specification, drawings and abstract is incorporated herein by reference in its entirety.

BACKGROUND OF THE INVENTION

1. Field of the Invention

The invention relates generally to a ball screw unit, and more specifically to a ball screw unit that is used in a state in which a screw shaft does not rotate but moves linearly in its axial direction.

2. Description of the Related Art

A ball screw unit that includes a screw shaft and a ball screw nut which is screwed onto the screw shaft via balls is commonly used for an electric actuator or a shock absorber. For example, Japanese Patent Application Publication No. 2005-264992 (JP-A-2005-264992) describes that a ball screw unit, which has a ball screw nut that is connected to a motor and a screw shaft that moves linearly, is applied to a shock absorber.

A shock absorber is usually provided with a stopper so that a screw shaft is prevented from moving by an amount that exceeds a predetermined amount when a large external force is applied. Immediately before movement of the screw shaft is stopped by the stopper, the screw shaft is moving at a high speed and a ball screw nut is rotating at a high speed. Therefore, a large rotational inertia force may be generated at the ball screw nut due to a sudden stop of the screw shaft, and an indentation may be formed in a path portion of a ball screw.

SUMMARY OF THE INVENTION

The invention provides a ball screw unit that is suitable for use in the state in which a screw shaft does not rotate but moves linearly in its axial direction.

An aspect of the invention relates to a ball screw unit including: a screw shaft that has a screw groove and spline grooves; a ball screw nut that is screwed to the screw groove of the screw shaft via balls; a spline outer cylinder that is splined to the spline grooves of the screw shaft, and that guides linear motion of the screw shaft in the axial direction of the screw shaft; a housing that holds one end of the spline outer cylinder, and that has a screw shaft passing wall in which a through hole, through which the screw shaft passes, is formed; and a biasing member that is arranged at the other end of the spline outer cylinder, and that biases the spline outer cylinder toward the screw shaft passing wall. In the ball screw unit, a tapered recess is formed in one of one end face of the spline outer cylinder and a face of the screw shaft passing wall, which faces the spline outer cylinder. In addition, a tapered projection, which is fitted in the tapered recess, is formed in the other of the one end face of the spline outer cylinder and the face of the screw shaft passing wall, which faces the spline outer cylinder. With this structure, the spline outer cylinder is allowed to move with respect to the housing when a force that overcomes a biasing force of the biasing member is applied to the spline outer cylinder.

The tapered recess may be formed in the one end face of the spline outer cylinder, and the tapered projection may be formed in the face of the screw shaft passing wall, which faces the spline outer cylinder.

The spline outer cylinder is pushed against the housing with a biasing force of the biasing member, for example, a disc spring, whereby the spline outer cylinder is held by the housing. The tapered projection is kept in the tapered recess by the biasing force of the biasing member (if there is no biasing member, the tapered projection is fitted in the taper recess less tightly). Therefore, when a rotational force that is applied to the spline outer cylinder overcomes the biasing force of the biasing member, the spline outer cylinder rotates with respect to the housing. At this time, a taper face of the tapered recess of the spline outer cylinder slides in the upward direction with respect to a taper face of the tapered projection of the housing. As a result, the spline outer cylinder is allowed to move in the axial direction. Each of the tapered recess and the tapered projection may be, for example, trapezoidal when viewed in the radial direction of the spline outer cylinder and the housing. However, the shape of each of the recess and the projection may be changed as long as the taper face of the spline outer cylinder is allowed to slide in the upward direction with respect to the taper face of the housing.

The ball screw unit according to the aspect of the invention described above may be used as an actuator. In this case, the ball screw nut is rotated by a motor, whereby the screw shaft linearly moves. Alternatively, the ball screw unit may be used as a shock absorber. In this case, the screw shaft is linearly moved by an external force, whereby the ball screw nut is rotated and an electromagnetic force generated by the motor is used as a damping force.

In either case, the screw shaft reciprocates linearly. Usually, a stopper is provided to prevent the screw shaft from moving by an amount that exceeds a predetermined amount in a predetermined direction in the axial direction (predetermined direction is referred to as "forward direction" in this specification. The term "forward direction" signifies the direction in which the screw shaft moves to cause the stopper to hit a predetermined portion. The "forward direction" may be any direction, for example, upward direction, downward direction, forward direction, rearward direction, rightward direction or the leftward direction). The stopper may be, for example, a flange portion formed on the screw shaft, which contacts the housing when the screw shaft moves by a predetermined amount. Alternatively, the stopper may be formed on a member that linearly moves along with the screw shaft, or may be provided on a member that does not move linearly (housing or hollow shaft). The stopper defines the movement limit position of the screw shaft in the forward direction. Therefore, when the screw shaft reaches the movement limit position, the screw shaft is forcibly stopped. If the screw shaft is moving at a high speed, a large rotational inertia force is applied to the nut. As a result, an indentation may be formed in a ball screw path.

In the ball screw unit according to the aspect of the invention described above, linear motion of the screw shaft is guided by the spline grooves formed in the screw shaft and the spline outer cylinder that is splined to the spline grooves, and the spline outer cylinder is allowed to rotate to a certain degree. Therefore, an impact load that is applied to the screw shaft when the stopper hits a predetermined portion is absorbed. More specifically, the spline outer cylinder is pushed against the housing, whereby the spline outer cylinder is held by the housing with a biasing force of the biasing member. Therefore, when a rotational force that is externally applied is small, the spline outer cylinder is firmly fitted to the housing with the biasing force. When the linear motion of the screw shaft is stopped by the stopper, a large rotational inertia force is applied to the nut, the screw shaft receives a rotational force from the nut, and the spline outer cylinder that is not allowed to rotate with respect to the screw shaft also receives a large rotational force. In this case, because the tapered projection of the housing is fitted in the tapered recess of the spline outer cylinder, the spline outer cylinder rotates with respect to the housing. In addition, the taper face of the tapered recess of the spline outer cylinder slides upward along the taper face of the tapered projection of the housing, whereby the spline outer cylinder moves in the upward direction. Thus, the rotational force is absorbed, which prevents a large force that may cause an indentation from being applied to the ball screw path portion.

The tapered recess may be formed in the face of the screw shaft passing wall, which faces the spline outer cylinder, and the tapered projection may be formed in the one end face of the spline outer cylinder.

The spline may be ball spline or engagement-type spline, for example, involute spline.

The biasing member may be a disc spring. However, the biasing member is not limited to a disc spring. Various types of springs may be used as the biasing member. When the maximum amount by which the biasing member is allowed to be compressed is expressed by A and the amount by which the projection is fitted in the recess is expressed by B, preferably, A is smaller than B (A<B).

With the ball screw unit according to the aspect of the invention described above, an impact load that is applied when the screw shaft is forcibly stopped is reduced, whereby formation of an indentation in the ball screw path portion is prevented. Thus, it is possible to solve the problem that an inertia moment increases when a larger-sized ball screw unit is employed to ensure sufficient strength of the ball screw. As a result, it is possible to produce a more compact and lighter ball screw unit.

BRIEF DESCRIPTION OF THE DRAWINGS

The foregoing and further features and advantages of the invention will become apparent from the following description of an example embodiment with reference to the accompanying drawings, wherein the same or corresponding portions are denoted by the same reference numerals and wherein:

FIGS. 2A and 2B are enlarged cross-sectional views showing a main portion of the ball screw unit in FIG. 1.

DETAILED DESCRIPTION OF EMBODIMENT

Figure 1:
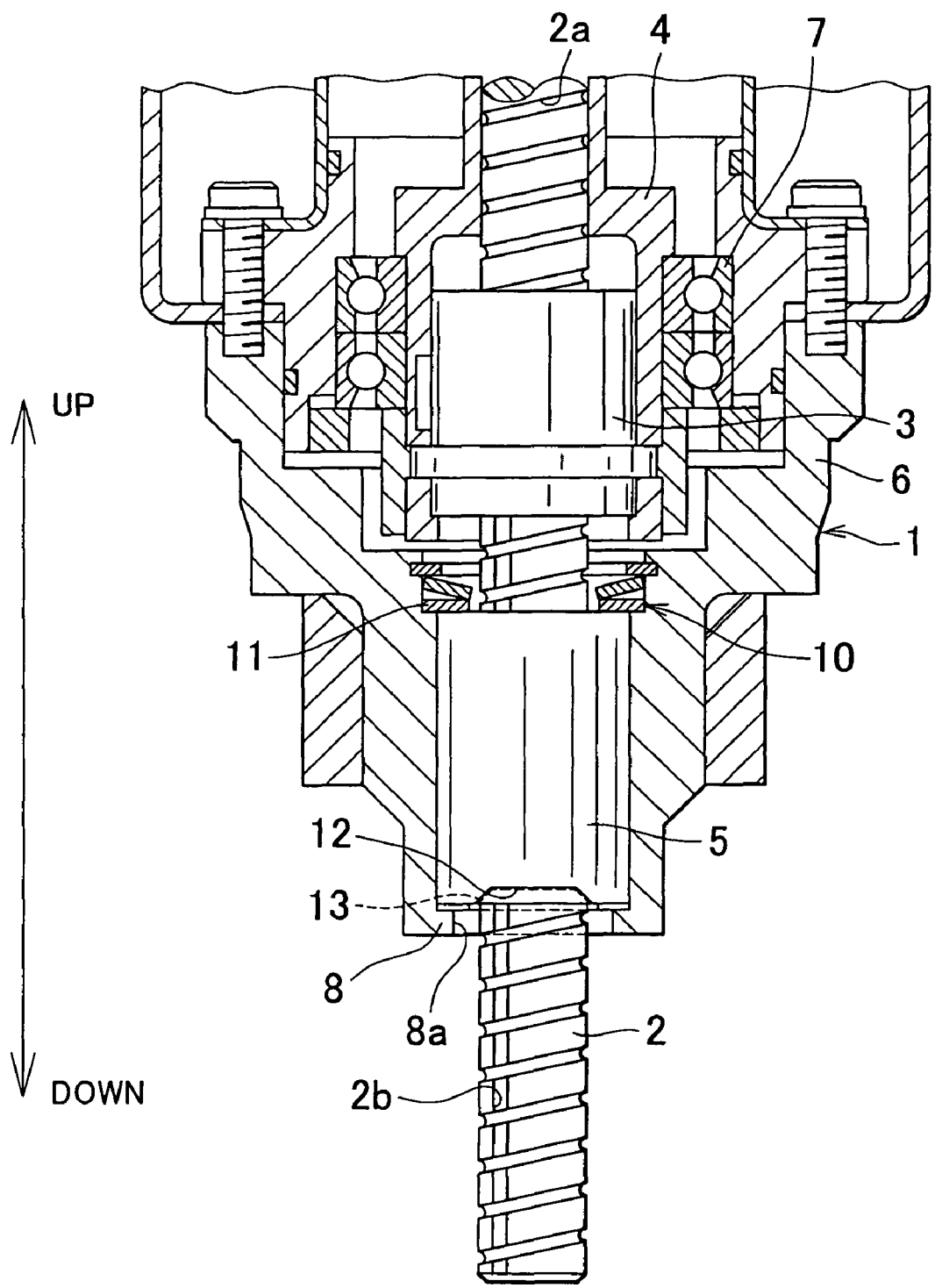
FIG. 1 is a cross-sectional view showing a ball screw unit according to an embodiment of the invention.

Hereafter, an example embodiment of the invention will be described with reference to the accompanying drawings. The "up-and-down direction", the "upward direction", and the "downward direction" in the description below are directions indicated by arrows in the drawings. The "forward direction" in the description below corresponds to the "upward direction". Note that, these expressions concerning the directions are employed just for ease of explanation, and the orientation of a ball screw unit according to the embodiment of the invention when it is actually used is not particularly limited.

FIG. 1 shows a ball screw unit according to an embodiment of the invention.

A ball screw unit 1 includes: a steel screw shaft 2 that extends in the up-and-down direction and that has a screw groove 2a and spline grooves 2b which extend in the up-and-down direction; a ball screw nut 3 that is screwed to the screw groove 2a of the screw shaft 2 via balls; a hollow shaft 4 that is fixed to the ball screw nut 3 and that extends in the upward direction; a ball spline outer cylinder 5 that is splined to the spline grooves 2b of the screw shaft 2 via balls and that guides linear motion of the screw shaft 2 in the up-and-down direction (axial direction of the screw shaft 2); a housing 6 that rotatably holds the hollow shaft 4 via a bearing 7 and that holds the ball spline outer cylinder 5; and a ball screw protection unit 10 that protects a ball screw.

The screw shaft 2 and the hollow shaft 4 are coaxially arranged. In the ball screw unit 1, the hollow shaft 4 serves also as a rotor of a motor, and the hollow shaft 4 and the ball screw nut 3 are rotated to produce linear motion of the screw shaft 2. The ball screw unit 1 is used in this manner.

The housing 6 has a screw shaft passing wall 8 at a lower end portion. A through-hole 8a is formed in the screw shaft passing wall 8, and the screw shaft 2 passes through the screw shaft passing wall 8. The spline outer cylinder 5 is held at the lower end by the screw shaft passing wall 8. In an existing ball screw unit, the spline outer cylinder 5 is not allowed to rotate with respect to the housing 6 and is not allowed to move in the axial direction with respect to the housing 6. In contrast, in the ball screw unit according to the embodiment of the invention, the spline outer cylinder 5 is allowed to rotate with respect to the housing 6 by a predetermined amount and is allowed to move in the axial direction (up-and-down direction) with respect to the housing 6 by a predetermined amount.

The ball screw unit 1 is suitable for, for example, an electromagnetic suspension for a vehicle. The electromagnetic suspension is a shock absorber that converts axial motion transmitted from a tire into rotational motion with the use of a ball screw mechanism, introduces this rotational motion into a motor, and uses an electromagnetic force generated by the motor as a damping force. When overstroke of the suspension occurs, for example, because a vehicle runs on to a bump, the screw shaft 2 moves in the upward direction (forward direction) at a high speed and a bump stopper that is provided at a linear motion portion hits, for example, a motor flange. In this case, the motor, which has been rotating at a high speed, suddenly stops and an excessive axial force may be applied to the path portions of the ball screw formed of the screw shaft 2 and the ball screw nut 3 due to an inertia torque of the motor. How to protect the ball screw mechanism in this case is an issue to be resolved.

The ball screw protection unit 10 allows the screw shaft 2 to rotate to a certain degree to absorb a high load, thereby protecting the ball screw. The ball screw protection unit 10 includes a disc spring 11 that is provided at an upper end of the spline outer cylinder 5 and that serves as a biasing member which biases the spline outer cylinder 5 in the downward direction (toward the screw shaft passing wall 8); a tapered recess 12 that is formed in a bottom face of the spline outer cylinder 5; and a tapered projection 13 that is formed on a top face of the screw shaft passing wall 8 of the housing 6 (face that faces the bottom face of the spline outer-cylinder 5) and that is fitted in the tapered recess 12.

The tapered recesses 12 are formed at two positions that are apart from each other by, for example, 180 degrees in the circumferential direction. Similarly, the tapered projections are formed at two positions that are apart from each other by, for example, 180 degrees in the circumferential direction. As shown in the enlarged views in FIGS. 2A and 2B, each of the tapered recess 12 and the tapered projection 13 is formed in a trapezoidal shape when viewed in the radial direction. The projection 13 is fitted in the recess 12 under a biasing force of the disc spring 11 that acts in the downward direction shown in FIG. 2A. Therefore, if a large force that overcomes the biasing force of the disc spring 11 is applied to the spline outer cylinder 5, the spline outer cylinder 5 is allowed to rotate with respect to the housing 6, and is allowed to move upward in the axial direction. Each of the recess 12 and the projection 13 has a tapered shape. Therefore, if the spline outer cylinder 5 rotates in the state in FIG. 2A, a taper face 12a of the spline outer cylinder 5 slides in the upward direction with respect to a taper face 13a of the housing 6. As a result, the spline outer cylinder 5 is allowed not only to rotate but also to move in the axial direction (upward direction) as shown in FIG. 2B. In the ball screw unit 1, an amount B by which the projection 13 is fitted in the recess 12 as shown in FIG. 2A is preferably larger than a maximum amount A by which the disc spring 11, which serves as a biasing member, is allowed to be compressed (A<B). In the ball screw unit 1, when forward movement of the screw shaft 2 is stopped by the stopper, a large rotational inertia force is applied to the ball screw nut 3, the screw shaft 2 receives a rotational force from the ball screw nut 3, and a large rotational force is applied to the spline outer cylinder 5 that is not allowed to rotate with respect to the screw shaft 2. In this case, because the tapered projection 13 of the housing 6 is fitted in the tapered recess 12 of the spline outer cylinder 5, the spline outer cylinder 5 rotates with respect to the housing 6, and moves in the axial direction because the taper face 12a of the recess 12 slides in the upward direction with respect to the taper face 13a of the projection 13. Thus, the rotational force is absorbed, whereby application of a large force that may cause an indentation to the path portion of the ball screw is prevented.

The ball screw unit 1 may be used as an electric actuator. In this case, a rotational driving force generated by the motor is converted into an axial thrust of the screw shaft 2 via the ball screw nut 3, an axial reaction force against the thrust is received by the bearing 7 to produce linear motion of the screw shaft 2, an axial load that is applied to the screw shaft 2 is borne by the ball screw nut 3, and a torque is received by the spline outer cylinder 5.

In the embodiment of the invention described above, the tapered recess 12 is formed in the spline outer cylinder 5 and the tapered projection 13 is formed in the housing 6. Alternatively, the tapered recess may be formed in the housing 6 and the tapered projection may be formed in the spline outer cylinder 5.

What is claimed is:

1. A ball screw unit, comprising:
    a screw shaft that has a screw groove and spline grooves;
    a ball screw nut that is screwed to the screw groove of the screw shaft via balls;
    a spline outer cylinder that is splined to the spline grooves of the screw shaft, and that guides linear motion of the screw shaft in an axial direction of the screw shaft;
    a housing that holds one end of the spline outer cylinder, and that has a screw shaft passing wall in which a through hole, through which the screw shaft passes, is formed; and
    a biasing member that is arranged at the other end of the spline outer cylinder, and that biases the spline outer cylinder toward the screw shaft passing wall, wherein
    a tapered recess is formed in one of one end face of the spline outer cylinder and a face of the screw shaft passing wall, which faces the spline outer cylinder, and a tapered projection, which is fitted in the tapered recess, is formed in the other of the one end face of the spline outer cylinder and the face of the screw shaft passing wall, which faces the spline outer cylinder, so that the spline outer cylinder is allowed to move with respect to the housing when a force that overcomes a biasing force of the biasing member is applied to the spline outer cylinder.

2. The ball screw unit according to claim 1, wherein:
    the tapered recess is formed in the one end face of the spline outer cylinder; and
    the tapered projection is formed in the face of the screw shaft passing wall, which faces the spline outer cylinder.

3. The ball screw unit according to claim 1, wherein:
    the tapered recess is formed in the face of the screw shaft passing wall, which faces the spline outer cylinder; and
    the tapered projection is formed in the one end face of the spline outer cylinder.

4. The ball screw unit according to claim 1, wherein each of the tapered recess and the tapered projection is trapezoidal when viewed in a radial direction of the spline outer cylinder and the housing.

5. The ball screw unit according to claim 1, wherein multiple tapered recesses and multiple tapered projections that are fitted in the respective tapered recesses are formed at predetermined intervals in a circumferential direction of the spline outer cylinder and the housing.

6. The ball screw unit according to claim 5, wherein two tapered recesses and two tapered projections are formed at positions that are apart from each other by 180 degrees in the circumferential direction.

7. The ball screw unit according to claim 1, wherein an amount by which the tapered projection is fitted in the tapered recess is larger than a maximum amount by which the biasing member is allowed to be compressed.

* * * * *